United States Patent [19]
Artemjev et al.

[11] Patent Number: 5,551,639
[45] Date of Patent: Sep. 3, 1996

[54] METHOD AND APPARATUS FOR SOLID MATERIAL GRINDING

[75] Inventors: Vladimir K. Artemjev, Moscow, Russian Federation; Amando J. Garcia-Segovia, San Pedro Garza Garcia, Mexico

[73] Assignees: Standart 90, Moscow, U.S.S.R.; Cementos Mexicanos, S.A., Monterrey, Mexico

[21] Appl. No.: 314,450

[22] Filed: Sep. 28, 1994

Related U.S. Application Data

[63] Continuation of Ser. No. 196,902, Feb. 15, 1994, abandoned, which is a continuation of Ser. No. 802,946, Dec. 6, 1991, abandoned.

[51] Int. Cl.$^6$ ............................ B02C 23/12; B02C 23/14
[52] U.S. Cl. ................... 241/5; 241/24.1; 241/29; 241/79.1; 241/80; 241/152.2
[58] Field of Search .............................. 241/5, 24, 29, 241/79.1, 80, 152.2, 153, 24.1

[56] References Cited

U.S. PATENT DOCUMENTS

| | | | |
|---|---|---|---|
| 2,332,701 | 10/1943 | Dowsett | 241/29 |
| 2,430,085 | 11/1947 | Spencer et al. | 241/152.2 X |
| 3,608,839 | 9/1971 | Fagerholt | 241/153 X |
| 3,688,991 | 9/1972 | Andrews | 241/5 |
| 4,783,011 | 11/1988 | Blasczyk et al. | 241/29 X |
| 4,887,383 | 12/1989 | Mathiesen et al. | 241/29 X |
| 4,919,339 | 4/1990 | Niemi | 241/152.2 X |
| 5,005,770 | 4/1991 | Suessegger | 241/80 X |
| 5,129,586 | 7/1992 | Artemjev et al. | 241/24 X |
| 5,221,051 | 6/1993 | Hashimoto et al. | 241/29 |
| 5,392,998 | 2/1995 | Suessegger et al. | 241/79.1 |

*Primary Examiner*—Rinaldi I. Rada
*Assistant Examiner*—Clark F. Dexter
*Attorney, Agent, or Firm*—A. Thomas S. Safford

[57] ABSTRACT

The invention relates to a method and to an apparatus for crushing and fine grinding of solid particulate materials, e.g. clinkers used in cement, utilizing a conventional ball mill. More particularly, the invention involves use of such a ball mill in the primary crushing of the material (which use is advantageously limited to the preliminary crushing operation requiring minimum energy consumption), and of a jet mill in the final crushing (conventionally done in a ball mill also). The jet mill is incorporated in a secondary independent grinding circuit which grinds the material to the required fineness value. The method of usage of the high capacity jet mill in combination with the ball mill, which is operated in the preliminary crushing mode differing from the conventional mode, considerably decreases energy consumption for the grinding process and can be used during the modernization of existing ball mills in different fields of industry such as in cement production—for grinding of cement precursors such as raw material mixtures and clinker, slags, quartz sands, carbonate-containing raw material, in ceramic articles manufacturing—for fine dispersity powder production, compound materials and others.

2 Claims, 1 Drawing Sheet

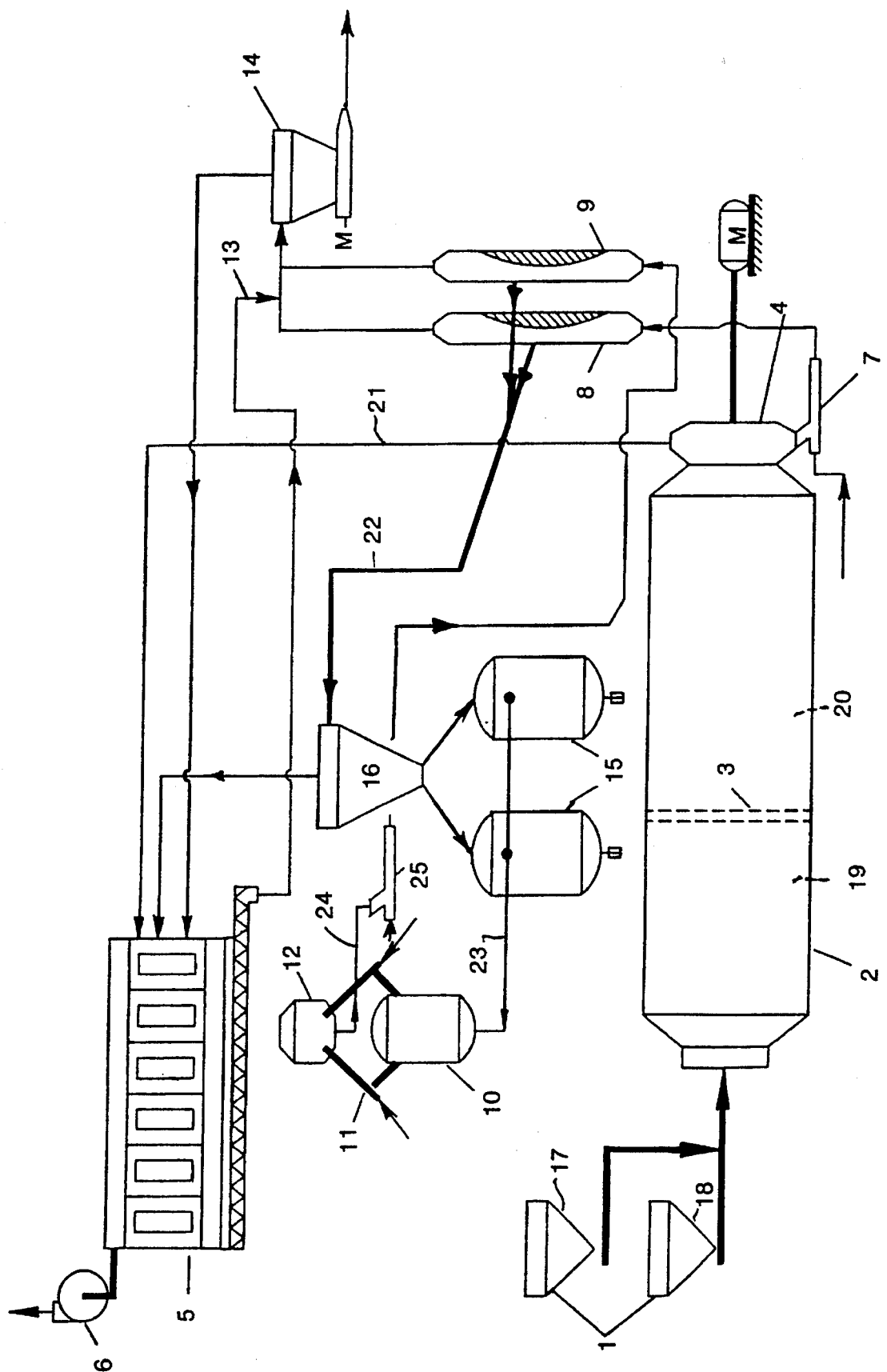

METHOD AND APPARATUS FOR SOLID MATERIAL GRINDING

This application is a continuation of application Ser. No. 08/196,902, filed Feb. 15, 1994, now abandoned, which in turn was a continuation of application Ser. No. 07/802,946, filed Dec. 6, 1991, now abandoned.

BACKGROUND OF THE INVENTION

Grinding of solid materials such as the raw materials for cement from crushed rock are well known and include ball mills, roller mills, pinch mills, hammer mills, jet mills, cone mills, etc. Examples of jet mills are British patent publication 2,232,096A published Dec. 5, 1990 and U.S. Pat. No. 3,877,647. Certain of the several types of mills have been combined in the past in various ways to achieve certain advantages of efficiency, product improvement, output, apparatus longevity, and the like.

SUMMARY OF THE INVENTION

A preferred embodiment of the invention is as follows:

The multipurpose apparatus for solid material grinding contains a feeder, a multichamber ball mill, a pneumatic system with a filter and a fan, which are connected to each other by means of pneumatic transportation pipelines and form a primary circuit for preliminary grinding and it is provided with a secondary "closed" circuit for solid material fine grinding which consists of a jet mill equipped with chamber pumps, an aeration chamber, classifiers and supersonic nozzle devices united by an impact "grinding" chamber for the solid material final grinding and its subsequent delivery to silos by means of pneumatic transportation systems (Fuller pumps, pneumatic chamber pumps, etc.).

An advantage of the invention is the method and apparatus intended for significant decrease of energy consumption due to development of the ball mill special operational mode during the solid material primary grinding. Some particular advantages are as follows:

(a) The changes in the ball charge ratio of the first and subsequent chambers of the ball mill and mass of the solid material feed (i.e. the ratio of the weight of the material charged to the chamber relative to the weight of the balls in the chamber). This ratio as supplied to a two chamber mill is advantageously equal to 0.20/0.24 (i.e. 0.20 in the first chamber and 0.24 in the second chamber;

(b) the changes and adjustments needed for a given separating diaphragm efficient cross-section size depend upon the changes of the ball charge ratio, the solid material mass and the speed at which the mass moves through the ball mill;

(c) the changes, according to the specially developed programs, of the basic parameters of the ball mill operation mode for discharge of the solid material having a fineness quality of $S=1,200-1,300$ cm$^2$/g. (Blaine) specific surface which results in an overall specific energy consumption decrease down to 40%, if compared with the rated conventional operational mode (using the ball mill for the whole grinding operation to yield a product of the same fineness). The next basic factor which defines the invention is the jet supersonic mill of high throughput capacity which performs the solid material final grinding and pulverization down to the required fineness with minimum energy consumption due to increase of the solid material particles speed during their collisions and also the ability to carry out continuous material classification (so that as the product achieves desired fineness, it is not thereafter unnecessarily handled). Also, some items of the existing auxiliary equipment are eliminated in the new "closed" circuit (e.g. elevators, classifiers, pipelines and so on).

PURPOSE OF THE INVENTION

An object of the invention, therefore, is to provide the method and the apparatus intended for preliminary crushing and fine grinding of solid material within one apparatus with significant decrease of energy consumption relative to the actual consumption and provision of the required grinding quality without the ball mill throughput capacity decrease. Another object is to upgrade existing ball mill installations to increase their efficiency enabling a decrease in the overall energy consumptions per unit of product produced with a resulting increased flexibility of output and degree of grinding.

The objects are achieved according to the invention by the provision of the jet mill, which is operated in the "closed" circuit between the ball mill and the pneumatic transportation system for the final product delivery to the silos, by changes of the ball and jet mills operational modes as of the whole interrelated multipurpose grinding apparatus, but not just a successive mechanical combination of two mills because the final material production by means of separate usage of the ball and jet mill which are operated in different modes is practically impossible. In other words, the complete output from the ball mill cannot merely be entirely fed to the jet mill, but the two must be integrated so that the jet mill receives only material that actually needs further comminution.

THE DRAWING

A preferred embodiment of the invention is shown in the drawing in which:

FIG. 1 shows the overall diagram of the multipurpose apparatus intended for solid material grinding with the lowest energy consumption.

DETAILED DESCRIPTION OF A PREFERRED EMBODIMENT

The multipurpose apparatus shown in FIG. 1 is intended for crushing and fine grinding of solid material (such as clinker) with significant decrease of energy consumption and comprises a feeder 1, a ball mill 2 charged with grinding bodies and equipped with diaphragms 3 between two grinding chambers, a discharge chamber 4 for crushed material discharge, an electric drive m, a pneumatic transportation pipeline 21 (for fines of a size in the final product range) with a filter 5 and a blower 6, a pneumatic device 7 for tailings transportation (e.g., a jet pump), a two-chamber pneumatic pump 15, ballistic classifiers 8 and 9, a material aeration chamber 10, nozzle devices 11, a jet mill grinding chamber 12, cyclones 16, a final product transportation pipeline 13, and a pneumatic transportation device 14 for final product delivery to storage silos (not shown).

The apparatus functions according to the method and invention as follows:

The particulate material (e.g., clinker and gypsum) is delivered via the feeder 1 (e.g., from storage bins 17 and 18) to the first chamber 19 of ball mill 2 charged with grinding bodies (e.g., steel balls) where the material crushing takes place, then the material is fed to the second chamber 20 for secondary crushing down to the required fineness appropriate for the jet mill (e.g., down to S=1,200–1,300 cm$^2$/g instead of 3,600 cm$^2$/g fineness, which latter is according to the conventional ball mill design). From the chamber 4 (containing the preliminarily crushed and deformed material) the dust-like particles present are fed to the filter system 5 via pipe 21 due to the action of blower 6 and delivered to the silos via pipe 13 together with the other final product.

The remaining volume of relatively coarse, deformed (comminuted) particles and remaining fines are conveyed by the jet pump 7 (e.g., a Fuller pump) to the ballistic classifier 8 for separation of the coarse tailings from the finer final product. A proportion of the tailings, delivered from the ballistic classifier 8 via pipe 22 and precipitated in the cyclone 16 is fed to the two-chamber pneumatic pump 15 used for continuously conveying the coarse tailings by a higher pressure air stream in pipe 23 to the aeration chamber 10 for provision of a constant supply of tailings and air concentrated volume in accordance to the necessary feeding volume and pressure value needed for effective operation as a jet mill. Then, the air stream with entrained tailings is drawn off from the aeration chamber 10 to the nozzle devices 11, which accelerate the tailings up to the required speed values. As a result the tailings are ground due to mutual collision of the opposite streams within the grinding chamber 12 in accordance with the required angle relative to the vertical axis of the chamber 12 wherein the angle determines the shock wave boundary stability within a grinding zone unlike the other jet mills. After grinding in the grinding chamber 12 the particles are fed to the classifier 9 via pipe 24 by means of jet pump 25 for the secondary classification, for the final product separation and any remaining coarse tailings return via pipe 22 to the cyclone 16 for further grinding in the jet mill grinding chamber 12 and the grinding cycle is thus resumed. During the apparatus operation its continuous operation can be performed with a new material or multicomponent mixtures for the joint crushing and fine grinding with significant energy saving up to 40% if compared with the conventional grinding using the ball mills exclusively.

What is claimed is:

1. Process for decreasing energy consumption in a ball mill during crushing and fine grinding of solid materials by means of a multipurpose grinding apparatus which performs preliminary grinding of material within a ball mill and fine grinding within a Jet mill comprising:

(a) feeding solid material into the ball mill:

(b) preliminarily grinding said material within at least one chamber of said ball mill, which said ball mill contains a reduced ball charge relative to a charge of balls otherwise needed to complete grinding if done wholly in the ball mill, to give a preground material;

(c) feeding at least a portion of said preground material by pneumatic means from said ball mill into a ballistic classifier of said jet mill;

(d) classifying said fed portion of said preground material into a final product having a specified fineness quality and into a relatively coarser product which requires further grinding;

(e) delivering said relatively coarser product from said classifier into a cyclone;

(f) transporting said final product from said ballistic classifier for ultimate collection;

(g) precipitating within said cyclone finer particles of said relatively coarser product;

(h) recovering and transporting for ultimate collection the fine particles qualifying as final product from the cyclone thus separating them from relatively coarser particles in the cyclone;

(i) delivering the relatively coarser particles from the cyclone into chamber pumps of said jet mill;

(j) from said chamber pumps aerating the relatively coarser particles therein and delivering the relatively coarser particles under high pressure and high velocity in at least two converging streams inside a grinding chamber of said jet mill to produce a fine finish ground material;

(k) submitting the fine finish ground material from said jet mill grinding chamber to secondary classification within another ballistic classifier of said jet mill;

(l) transporting for ultimate collection the fine finish ground material qualifying as final product obtained by secondary classification; and (m) recycling to said jet mill relatively coarse fine finish ground material obtained by the secondary classification.

2. A multipurpose grinding apparatus for crushing and fine grinding of solid materials with reduced energy consumption comprising;

(a) a ball mill provided with a feeder at one end, a discharge chamber at its other end, at least two ball charge chambers of a size effective for preliminary grinding of chunks of solid material into pulverized particles, and at least one interchamber diaphragm separating said at least two chambers;

(b) a filter, (c) first pneumatic transport means from said discharge to said filter;

(d) a fan connected with said filter for withdrawing the lightest of said pulverized particles produced by said ball mill from said discharge along said first pneumatic transport means and into said filter;

(e) a second pneumatic transport means for conveying the remaining relatively heavier particles of said pulverized particles produced in said ball mill from said discharge chamber to a primary ballistic classifier;

(f) a jet mill comprising at least two converging supersonic nozzle devices united by a common grinding chamber;

(g) a two-chamber pump;

(h) an aeration chamber connected between said pump and said jet mill;

(i) said primary ballistic classifier and a secondary ballistic classifier, each for separating lighter particles qualifying as final product from relatively heavier particles;

(j) a cyclone for coarse particle precipitation, said cyclone connected at an inlet to both said primary ballistic classifier and said secondary ballistic classifier to be fed by both with the relatively heavier particles separated in each of said respective classifiers, said cyclone further connected at one outlet to said filter to feed lighter particles from said cyclone to said filter, and connected at a second outlet to said two-chamber pump to feed seriatim heavier particles from said cyclone through the two-chamber pump, through the aeration chamber, and to the supersonic nozzle devices of the jet mill;

(k) a third pneumatic transport means connecting an outlet of said jet mill grinding chamber to said secondary classifier; and (l) a fourth pneumatic transport means for continuous conveying of said final product away from each of said ballistic classifiers and from said filter for storage delivery.

* * * * *